United States Patent
Walter et al.

(10) Patent No.: US 10,470,103 B2
(45) Date of Patent: *Nov. 5, 2019

(54) SYSTEM AND METHOD FOR AUTHENTICATION OF A COMMUNICATION DEVICE

(71) Applicant: AT&T Intellectual Property I, L.P., Atlanta, GA (US)

(72) Inventors: Edward Walter, Boerne, TX (US); Larry B. Pearson, San Antonio, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/894,491

(22) Filed: Feb. 12, 2018

(65) Prior Publication Data

US 2018/0167866 A1    Jun. 14, 2018

Related U.S. Application Data

(63) Continuation of application No. 15/397,786, filed on Jan. 4, 2017, now Pat. No. 9,930,609, which is a
(Continued)

(51) Int. Cl.
*H04W 48/02* (2009.01)
*H04L 29/06* (2006.01)
(Continued)

(52) U.S. Cl.
CPC ......... *H04W 48/02* (2013.01); *H04L 12/2878* (2013.01); *H04L 63/0428* (2013.01);
(Continued)

(58) Field of Classification Search
CPC ..... H04W 8/183; H04W 48/02; H04W 12/06; H04L 63/0876; H04L 12/06;
(Continued)

(56) References Cited

U.S. PATENT DOCUMENTS

2005/0152371 A1\* 7/2005 Qu ................... H04L 12/2856
370/395.1
2006/0168162 A1   7/2006 Woundy
(Continued)

FOREIGN PATENT DOCUMENTS

GB     2423221    8/2006
JP     6046162    2/1994

*Primary Examiner* — Wayne H Cai
(74) *Attorney, Agent, or Firm* — Guntin & Gust, PLC; Mark Wilinski

(57) ABSTRACT

A system and method for authentication of a communication device is disclosed. A system that incorporates teachings of the present disclosure may include, for example, an authentication system can have a controller element that receives from a communication device by way of a packet-switched network an authentication request comprising a first identification (ID) of a virtual gateway and a second ID of the communication device. The virtual gateway and at least one network element of the packet-switched network can be provisioned to have a physical association with each other such that other network elements of the packet-switched network deny services to the virtual gateway when the virtual gateway attempts to operate outside of said physical association. From said physical association and the aforementioned IDs the controller element can authenticate the communication device. Additional embodiments are disclosed.

20 Claims, 5 Drawing Sheets

Related U.S. Application Data continuation of application No. 15/139,468, filed on Apr. 27, 2016, now Pat. No. 9,565,199, which is a continuation of application No. 11/688,601, filed on Mar. 20, 2007, now Pat. No. 9,350,716.

(51) Int. Cl.
*H04L 12/28* (2006.01)
*H04W 8/18* (2009.01)
*H04W 12/06* (2009.01)

(52) U.S. Cl.
CPC .......... *H04L 63/08* (2013.01); *H04L 63/0876* (2013.01); *H04L 63/126* (2013.01); *H04W 8/183* (2013.01); *H04W 12/06* (2013.01)

(58) Field of Classification Search
CPC . H04L 12/2878; H04L 63/08; H04L 63/0428; H04L 63/126
See application file for complete search history.

(56) References Cited

U.S. PATENT DOCUMENTS

| | | |
|---|---|---|
| 2006/0223498 A1 | 10/2006 | Gallagher |
| 2006/0268902 A1 | 11/2006 | Bonner |
| 2007/0022469 A1 | 1/2007 | Cooper |
| 2007/0174443 A1* | 7/2007 | Shaheen ............... H04W 8/06 709/223 |
| 2007/0268908 A1 | 11/2007 | Linkola et al. |
| 2008/0019267 A1* | 1/2008 | Ku ...................... H04L 61/157 370/229 |
| 2008/0155659 A1* | 6/2008 | Gazier ................. H04L 63/08 726/4 |
| 2008/0254833 A1 | 10/2008 | Keevill et al. |
| 2008/0276305 A1* | 11/2008 | Chan .................. H04L 63/102 726/5 |
| 2016/0241571 A1 | 8/2016 | Walter et al. |
| 2017/0118694 A1 | 4/2017 | Walter et al. |

* cited by examiner

SYSTEM AND METHOD FOR AUTHENTICATION OF A COMMUNICATION DEVICE

CROSS-REFERENCE TO RELATED APPLICATIONS

This application is a Continuation of U.S. patent application Ser. No. 15/397,786 filed Jan. 4, 2017, which is a Continuation of U.S. patent application Ser. No. 15/139,468 (now U.S. Pat. No. 9,565,199) filed Apr. 27, 2016, which is a Continuation of U.S. patent application Ser. No. 11/688,601 (now U.S. Pat. No. 9,350,716) filed Mar. 20, 2007. The contents of each of the foregoing are hereby incorporated by reference into this application as if set forth herein in full.

FIELD OF THE DISCLOSURE

The present disclosure relates generally to communication systems, and more specifically to a system and method for authentication of a communication device.

BACKGROUND

Identity theft over the Internet has been and continues to be an issue faced by service providers and its subscribers. As common communication devices such as home or office phones migrate to the Internet for data as well as voice communications, a risk arises that private information associated with these communication devices (e.g., a Media Access Control address, serial number, etc.) can be stolen and used to program counterfeit devices to access communication services of subscribers without authorization.

A need therefore arises for a system and method for authentication of a communication device.

DETAILED DESCRIPTION

Embodiments in accordance with the present disclosure provide a system and method for authentication of a communication device.

In a first embodiment of the present disclosure, an authentication system can have a controller element that receives from a communication device by way of a packet-switched network an authentication request comprising a first identification (ID) of a gateway and a second ID of the communication device. The gateway and at least one network element of the packet-switched network can be provisioned to have a physical association with each other such that other network elements of the packet-switched network deny services to the gateway when the gateway attempts to operate outside of said physical association. The controller element can further retrieve first and second authentication IDs according to a select one of the first and second IDs supplied by the communication device, and authenticate the communication device in response to detecting a match between the first and second IDs and the first and second authentication IDs.

In a second embodiment of the present disclosure, a computer-readable storage medium in a gateway can have computer instructions for supplying a first ID of said gateway for use by an authentication system to authenticate a communication device based on the gateway having a physical association with at least one network element of a communication system.

In a third embodiment of the present disclosure, a communication device can have a controller element that initiates an authentication process with an authentication system that associates a gateway with the communication device according to a first ID of the gateway, a second ID of the communication device, and a physical association between the gateway and at least one network element of a communication system.

In a fourth embodiment of the present disclosure, a method can involve authenticating a communication device by having a service provider of a Voice over Internet Protocol (VoIP) service establish an agreement with a service provider of a packet-switched network to supply identification data of a gateway managed by the service provider of the packet-switched network to authenticate the communication device requesting the VoIP service.

Figure 1:
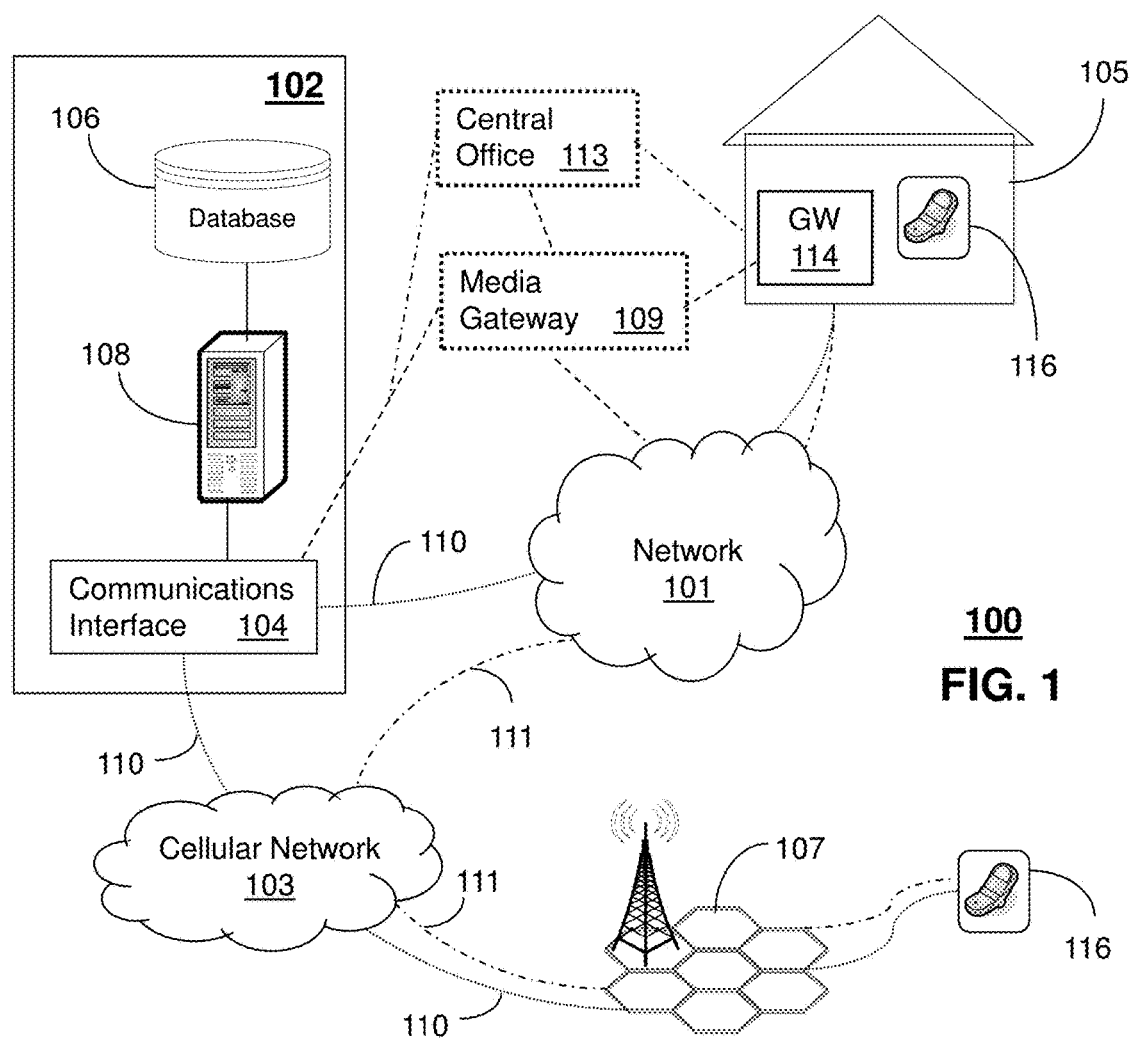
FIG. 1 depicts an exemplary embodiment of a communication system.

FIG. 1 depicts an exemplary embodiment of a communication device 116 communicating by way of wired and wireless access points (WAPs) with other communication devices and/or a network proxy 102 which collectively operate in a communication system 100. The communication device 116 can be a multimode VoIP terminal. However, the present disclosure contemplates the use of other types of communication devices, including other types of voice, video and data devices. The communication system 100 can comprise a packet-switched network 101. The packet-switched network can be an Internet Service Provider (ISP) network 101. The network 101 can be coupled to the network proxy 102, a cellular network 103 and network elements located in a building 105 representing an enterprise or residence. The ISP network 101 utilizes technology for transporting Internet traffic.

In an enterprise setting, the building 105 can include a gateway 114 that provides voice and/or video connectivity services between communication devices 116, such as VoIP terminals or other forms of communication devices of enterprise personnel. In a residential setting, the building 105 can include a gateway 114 represented by, for example, a residential gateway coupled to a central office 113 utilizing conventional telephonic switching for processing calls with third parties.

The network proxy 102 can be used to control operations of a media gateway 109, the central office 113 and the gateway 114. Communications between the network proxy 102, the communication devices 116 and other network elements of the communication system 100 can conform to any number of signaling protocols such as a session initiation protocol (SIP), or a video communications protocol such as H.323 which combines video and voice over a packet-switched network.

The network proxy 102 can comprise a communications interface 104 that utilizes common technology for communicating over an IP interface with the network 101, the media gateway 109, the cellular network 103, and/or the gateway 114. By way of the communications interface 104, the network proxy 102 can direct by common means any of the foregoing network elements to establish packet switched data, voice, and/or video connections between communication devices 116 distributed throughout the communication system 100. The network proxy 102 can further comprise a memory 106 (such as a high capacity storage medium) embodied in this illustration as a database, and a controller 108 that makes use of computing technology such as a desktop computer, or scalable server for controlling operations of the network proxy 102. The network proxy 102 can operate as an IP Multimedia Subsystem (IMS) conforming in part to protocols defined by standards bodies such as 3GPP (Third Generation Partnership Protocol).

Under the control of the network proxy 102, the media gateway 109 can link packet-switched and circuit-switched technologies such as the cellular network 103 (or central office 113) and the network 101, such as an ISP network. The media gateway 109 can conform to a media gateway control protocol (MGCP) also known as H.248 defined by work groups in the Internet Engineering Task Force (IETF). This protocol can handle signaling and session management needed during a multimedia conference. The protocol defines a means of communication which converts data from the format required for a circuit-switched network to that required for a packet-switched network. MGCP can therefore be used to set up, maintain, and terminate calls between multiple disparate network elements of the communication system 100. The media gateway 109 can therefore support hybrid communication environments for communication devices 116, including VoIP terminals.

The cellular network 103 can support voice and data services over a number of access technologies such as GSM-GPRS, EDGE, CDMA-1X, UMTS, WiMAX, software defined radio (SDR), and other known and future technologies. The cellular network 103 can be coupled to base stations 107 under a frequency-reuse plan for communicating over-the-air with roaming VoIP terminals 116.

Figure 2:
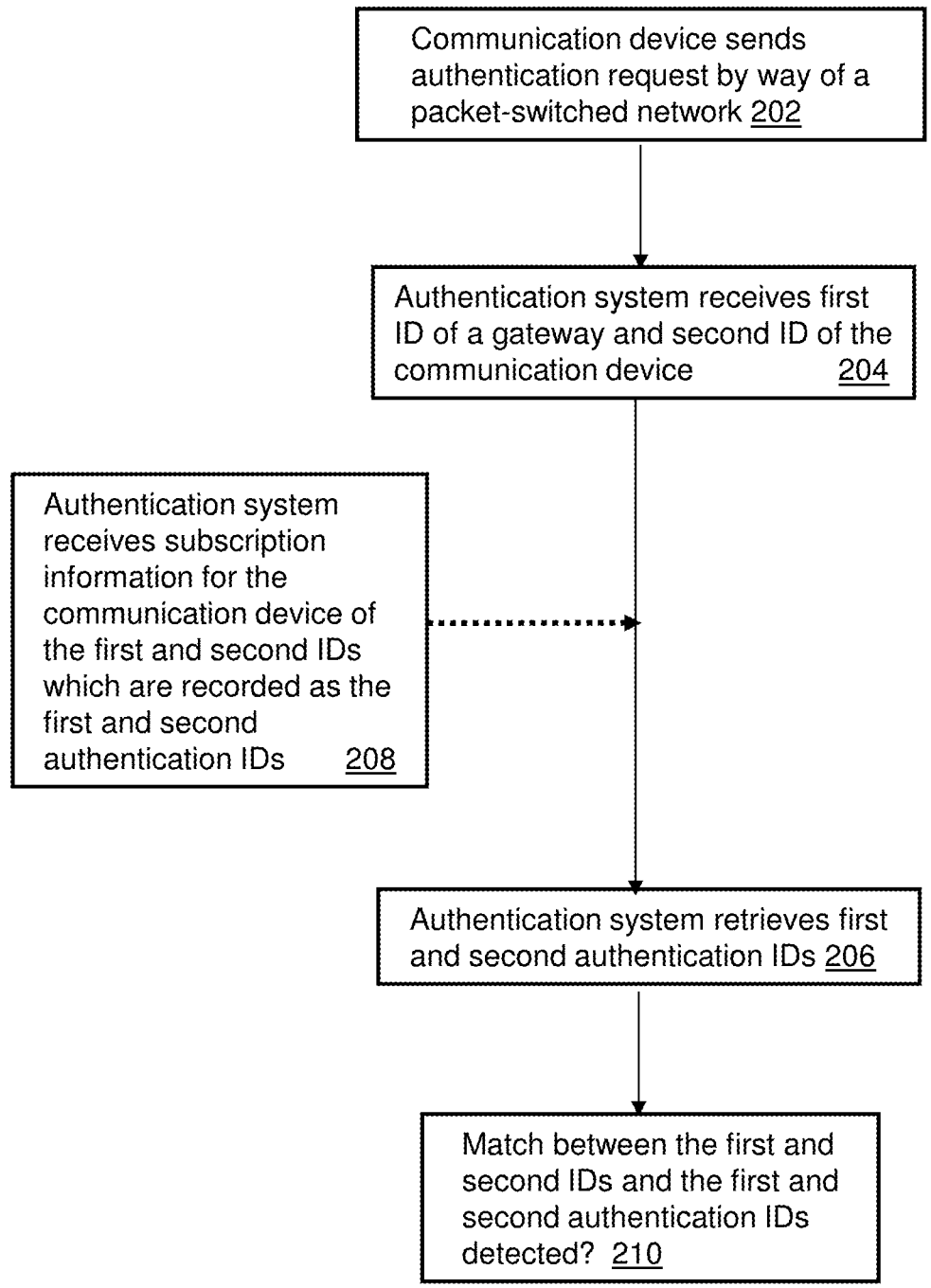
FIGS. 2-4 depict exemplary methods operating in portions of the communication system.

FIG. 2 depicts an exemplary method 200 operating in portions of the communication system 100. Method 200 has variants as depicted by the dashed lines. It would be apparent to an artisan with ordinary skill in the art that other embodiments not depicted in FIG. 2 are possible without departing from the scope of the claims described below.

With this in mind, in one embodiment, method 200 begins with step 202 in which the communication device 116 can send an authentication request by way of packet-switched network 101 to an authentication system, such as embodied in or operated by controller 108 of the network proxy 102. The authentication request can represent a registration of the communication device 116 with the network proxy 102. The gateway 114 can provide networking services to the communication device 116 in building 105 where both the gateway and the communication device can be housed.

Controller 108 can physically associate the communication device 116 with a particular gateway 114 for authentication purposes. In one embodiment, the packet-switched network 101 can be an ISP network having network elements. The gateway 114 and one or more of the network elements (e.g., digital subscriber line access multiplexer or DSLAM) can be provisioned to have a physical association with each other. Based upon this physical association, other network elements (e.g., other DSLAMs) of the ISP network 101 can deny services to the gateway 114 when the gateway attempts to operate outside of the physical association.

In step 204, the controller 108 can receive from one among the communication device 116 and its corresponding gateway 114 a first identification (ID) of the gateway and a second ID of the communication device. The first ID of the gateway 114 can be various identification information including a Media Access Control (MAC) address, a serial number, a model number, and an undisclosed code. The present disclosure contemplates the use of other types of identification information for the gateway 114, including combinations of the identification information. The second ID of the communication device 116 can be various identification information including a MAC address, a terminal ID, a serial number, a model number, and an undisclosed code. The present disclosure contemplates the use of other types of identification information for the communication device 116, including combinations of the identification information. In one embodiment, the second ID of the communication device can be a terminal ID having at least one of a Session Initiation Protocol Uniform Resource Identifier (SIP URI) or a Telephone (Tel) URI.

In step 206, controller 108 can retrieve a first authentication ID for the communication device 116 and a second authentication ID for the gateway 114 to be used for validation of the first and second IDs provided to the controller. Step 206 can be accomplished by utilizing the first and/or second IDs of the gateway 114 and communication device 116 as an index for retrieving from its database 106 or another memory said first and second authentication IDs. In one embodiment, the controller 108 can receive subscription information for the communication device 116, as in step 208. The subscription information can be the first and second IDs which are recorded as the first and second authentication IDs in database 106 or other memory device. In step 210, the controller 108 can authenticate the communication device 116 by matching, relating or otherwise correlating the first and second IDs supplied in step 204 with the first and second authentication IDs, respectively.

Figure 3:
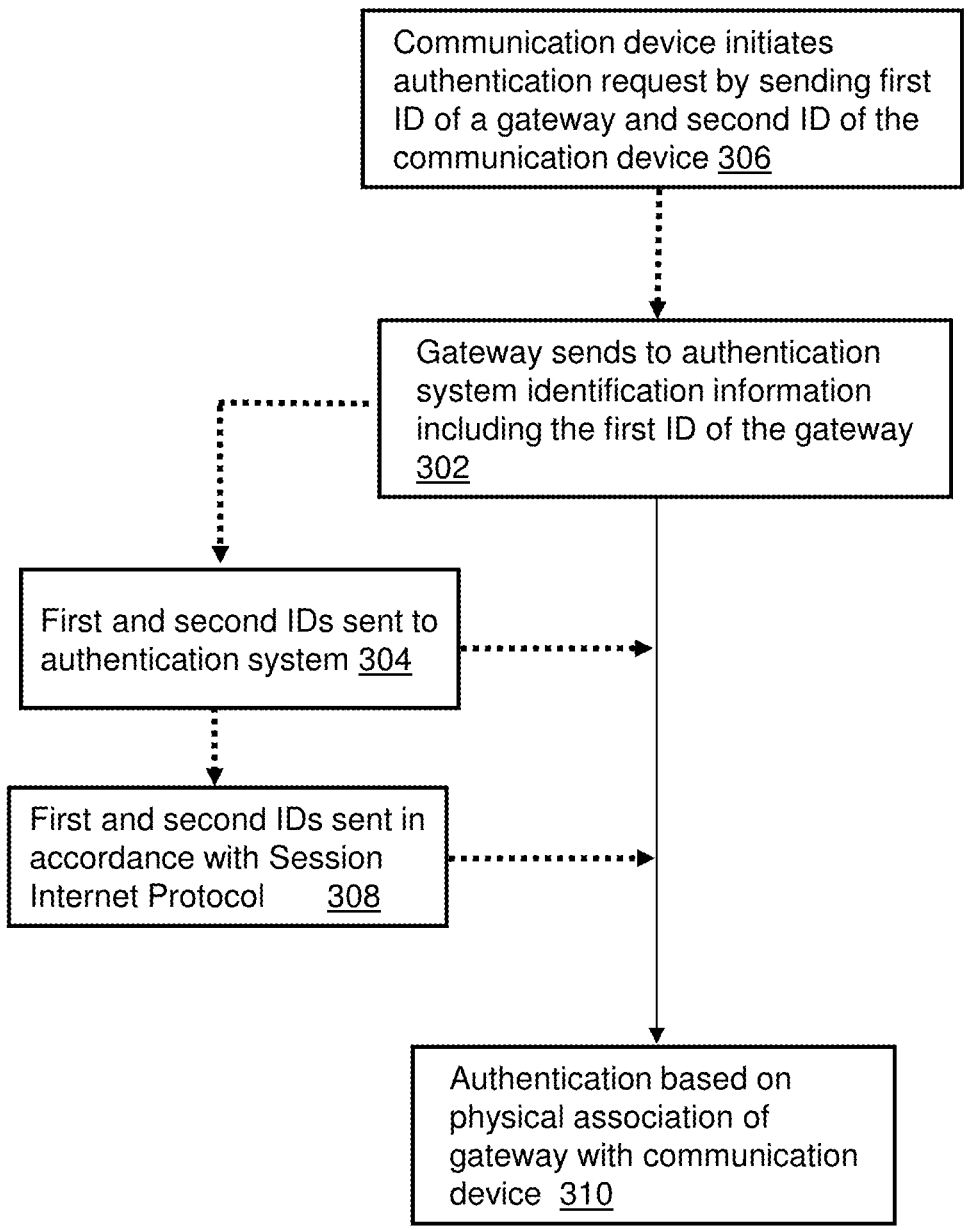

FIG. 3 depicts an exemplary method 300 operating in portions of the communication system 100. Method 300 has many variants as depicted by the dashed lines. It would be apparent to an artisan with ordinary skill in the art that other embodiments not depicted in FIG. 3 are possible without departing from the scope of the claims described below.

With this in mind, in one embodiment, method 300 can include the gateway 114 sending to an authentication system, such as embodied in or operated by controller 108, identification information including the first ID of the gateway, as in step 302. In another embodiment, the gateway 114 can receive a second ID associated with the communication device 116 and can supply both the first and second IDs to the controller 108, as in step 304. The first and second IDs can be transmitted in a Session Initiation Protocol (SIP) message. The first and second IDs can be various identification information including a MAC address, a terminal ID, a serial number, a model number, an undisclosed code, as well as other identification information or combinations of identification information.

In one embodiment, the network 101 can be an IMS network and the gateway 114 can be coupled to the IMS network, with the gateway serving as a proxy server. The gateway 114 and one or more of the network elements of the IMS network 101 can be provisioned to have a physical association with each other. Based upon this physical association, other network elements of the IMS network 101 can deny services to the gateway 114 when the gateway attempts to operate outside of the physical association.

In one embodiment, the communication device 116 can initiate the authentication request by supplying the first ID of the gateway 114 and the second ID of the communication device, as in step 306. The identification information, including the first and second IDs, can be sent according to various protocols, such as in conformance with SIP, as in step 308. However, the present disclosure contemplates the use of other protocol or any other common technique for sending or retrieving the identification information to be used in the authentication process.

In step 310, the controller 108 can authenticate the communication device 116 based on the physical association of the gateway 114 with the communication device, and by matching, relating or otherwise correlating the first and second IDs supplied with first and second authentication IDs stored in database 106.

Figure 4:
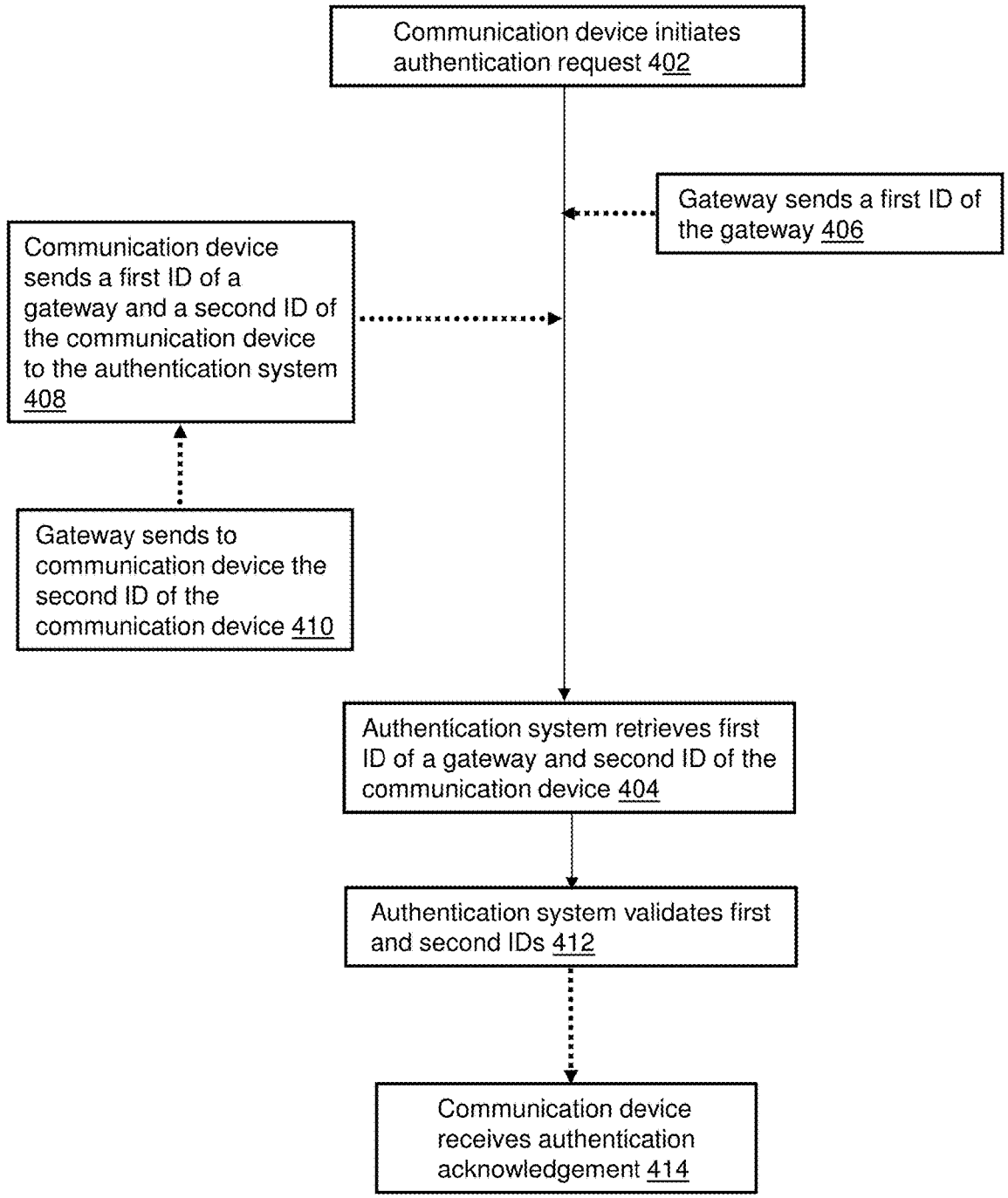

FIG. 4 depicts an exemplary method 400 operating in portions of the communication system 100. Method 400 has many variants as depicted by the dashed lines. It would be apparent to an artisan with ordinary skill in the art that other embodiments not depicted in FIG. 4 are possible without departing from the scope of the claims described below.

With this in mind, in one embodiment, method 400 can begin with step 402 where the communication device 116 initiates an authentication request to an authentication system. In step 404, the authentication system, for example, controller 108, can retrieve or otherwise be provided with the first ID of the gateway 114 and the second ID of the communication device 116. The first ID of the gateway 114 can be various identification information including a MAC address, a serial number, a model number, and an undisclosed code. The present disclosure contemplates the use of other types of identification information for the gateway 114, including combinations of the identification information. In one embodiment, the communication device 116 can query the gateway 114 for its MAC address utilizing an address resolution protocol (ARP) or any other common technique for retrieving the MAC address.

In one embodiment, the gateway 114 can send the first ID to the authentication system, as in step 406. The gateway 114 can intercept the authentication request submitted by the communication device 116 that includes the second ID of the communication device, can insert the first ID in the authentication request, and can submit the authentication request with the first and second IDs to the authentication system. In another embodiment, the communication device 116 can send the first and second IDs to the authentication system, as in step 408. In one embodiment, the communication device 116 can receive the second ID from the gateway 114, as in step 410, and send the first and second IDs to the authentication system. The second ID of the communication device 116 can be various identification information including a MAC address, a terminal ID, a serial number, a model number, and an undisclosed code. The present disclosure contemplates the use of other types of identification information for the communication device 116, including combinations of the identification information.

In step 412, the authentication system can validate the first and second IDs to authenticate the communication device 116. The validation can be based at least in part on the physical association of the communication device 116 with the gateway 114, which can be derived from the identification information including the first and second IDs of the gateway and communication device, respectively.

In one embodiment, the communication device 116 can receive an authentication acknowledgment in response to the authentication system validating the first and second IDs, as in step 414. For example, the authentication acknowledgment can correspond to an enablement of a VoIP service utilized by the communication device 116. However, the present disclosure contemplates the use of other authentication acknowledgements, including enablement of other media services as the acknowledgement.

In one embodiment, the network 101 can be an ISP network having network elements. The gateway 114 and one or more of the network elements can be provisioned to have a physical association with each other. Based upon this physical association, other network elements of the ISP network 101 can deny services to the gateway 114 when the gateway attempts to operate outside of the physical association.

In another embodiment, a service provider of a media service, for example, a VoIP service, can establish an agreement with a service provider of the packet-switched network 101 to supply identification data of the gateway 114 managed by the service provider of the packet-switched network to authenticate the communication device 116 requesting the media service. This embodiment can be useful in situations where said service providers operate as independent enterprises offering inter-operator services. This embodiment also provides consumers the flexibility to procure services from a VoIP service provider operating independently from an ISP service provider managing network 101. Under an inter-operator agreement that provides for the sharing of identification data of gateways 114, the VoIP operator can utilize any of the embodiments presented herein to authenticate a communication device 116 even if the gateway 114 belongs to an ISP of an unassociated service operator.

It would be apparent to an artisan with ordinary skill in the art from the aforementioned exemplary embodiments that there can be numerous other embodiments applied to the present disclosure. Accordingly, said artisan would expect that the present embodiments can be modified, reduced, or enhanced without departing from the scope and spirit of the claims described below. The reader is therefore directed to the claims below for a fuller understanding of the breadth and scope of the present disclosure.

Figure 5:
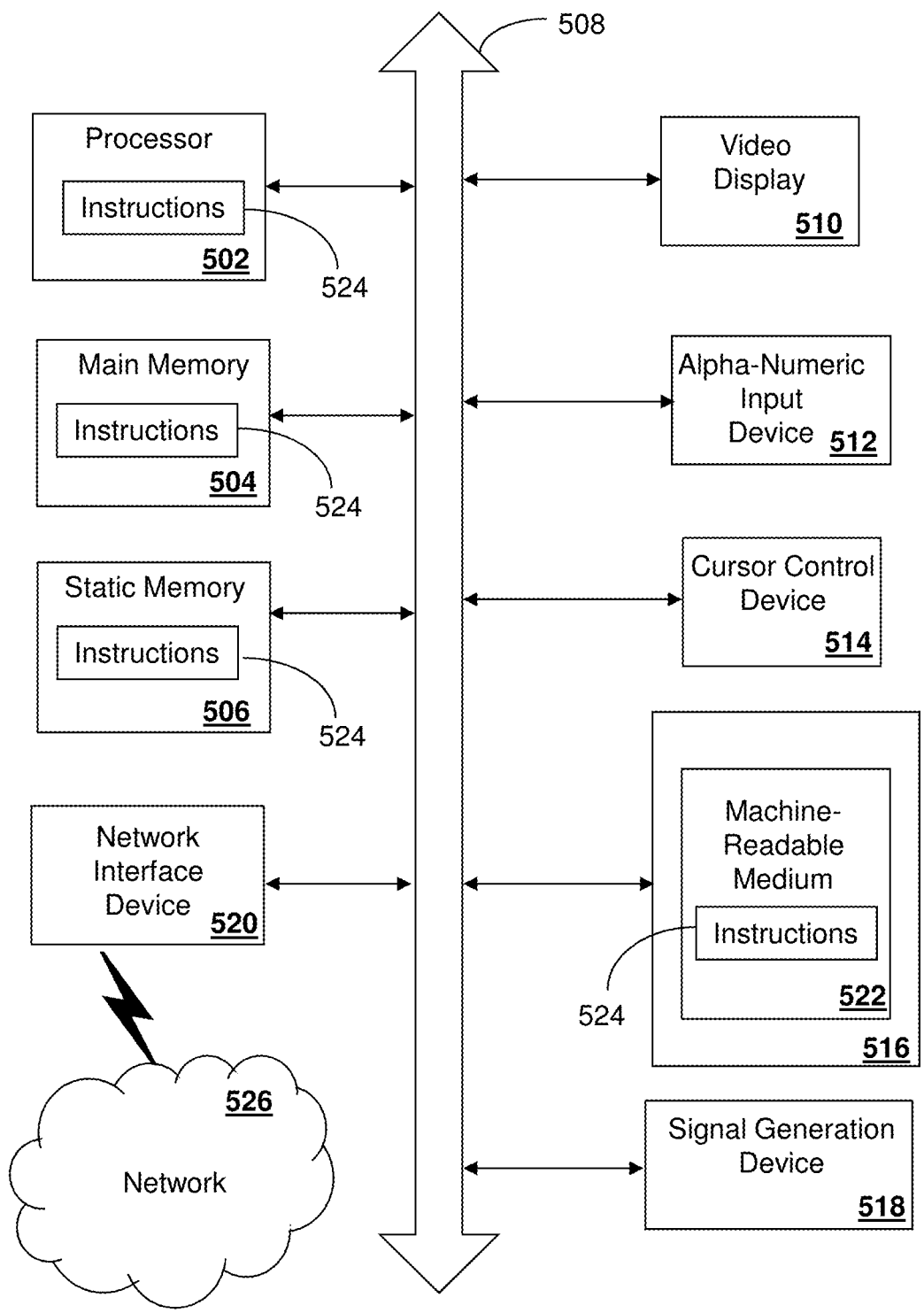
FIG. 5 depicts an exemplary diagrammatic representation of a machine in the form of a computer system within which a set of instructions, when executed, may cause the machine to perform any one or more of the methodologies disclosed herein.

FIG. 5 depicts an exemplary diagrammatic representation of a machine in the form of a computer system 500 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 500 may include a processor 502 (e.g., a central processing unit (CPU), a graphics processing unit (GPU, or both), a main memory 504 and a static memory 506, which communicate with each other via a bus 508. The computer system 500 may further include a video display unit 510 (e.g., a liquid crystal display (LCD), a flat panel, a solid state display, or a cathode ray tube (CRT)). The computer system 500 may include an input device 512 (e.g., a keyboard), a cursor control device 514 (e.g., a mouse), a mass storage medium 516, a signal generation device 518 (e.g., a speaker or remote control) and a network interface device 520.

The mass storage medium 516 may include a computer-readable storage medium 522 on which is stored one or more sets of instructions (e.g., software 524) embodying any one or more of the methodologies or functions described herein, including those methods illustrated above. The computer-readable storage medium 522 can be an electromechanical medium such as a common disk drive, or a mass storage medium with no moving parts such as Flash or like non-volatile memories. The instructions 524 may also reside, completely or at least partially, within the main memory 504, the static memory 506, and/or within the processor 502 during execution thereof by the computer system 500. The main memory 504 and the processor 502 also may constitute computer-readable storage media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 524, or that which receives and executes instructions 524 from a propagated signal so that a device connected to a network environment 526 can send or receive voice, video or data, and to communicate over the network 526 using the instructions 524. The instructions 524 may further be transmitted or received over a network 526 via the network interface device 520.

While the computer-readable storage medium 522 is shown in an example embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure.

The term "computer-readable storage medium" shall accordingly be taken to include, but not be limited to: solid-state memories such as a memory card or other package that houses one or more read-only (non-volatile) memories, random access memories, or other re-writable (volatile) memories; and magneto-optical or optical medium such as a disk or tape. Accordingly, the disclosure is considered to include any one or more of a computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:
1. An authentication system comprising:
a processor; and a memory that stores executable instructions that, when executed by the processor, facilitate performance of operations, the operations comprising:
  determining whether an authentication request provided by a virtual gateway located in a building is received from an expected network element that is physically associated with the virtual gateway;
  denying service to the virtual gateway responsive to detecting that the authentication request is not received from the expected network element; and
  responsive to detecting that the authentication request is received from the expected network element:
    retrieving authentication information associated with subscription information for a communication device located in the building, according to first and second identifications, the first identification being of the virtual gateway and the second identification being of the communication device; and
    authenticating the communication device in response to detecting a match between the first and second identifications and the authentication information,
  wherein an initiating authentication request from the communication device comprises the second identification of the communication device, and wherein the authentication request provided by the virtual gateway comprises an update to the initiating authentication request that adds the first identification of the virtual gateway to the initiating authentication request;
  wherein the first identification of the virtual gateway comprises a Media Access Control address, a serial number, a model number, and an undisclosed code, each associated with the virtual gateway; and
  wherein the second identification of the communication device comprises a Media Access Control address, a terminal ID, a serial number, a model number, and an undisclosed code, each associated with the communication device.

2. The authentication system of claim 1, wherein:
  the virtual gateway is communicatively coupled to a selected digital subscriber line access multiplexer of a plurality of digital subscriber line access multiplexers in a packet-switched network;
  wherein the selected digital subscriber line access multiplexer and the virtual gateway are not portable communication devices; and
  wherein the selected digital subscriber line access multiplexer is provisioned to provide services to the virtual gateway based on a physical association of the selected digital subscriber line access multiplexer to the virtual gateway.

3. The authentication system of claim 2, wherein a remaining plurality of digital subscriber line access multiplexers are provisioned to deny services to the virtual gateway when the virtual gateway operates outside of the physical association with the selected digital subscriber line access multiplexer.

4. The authentication system of claim 1, wherein the second identification comprises one of a Session Initiation Protocol Uniform Resource Identifier and a Telephone Uniform Resource Identifier.

5. The authentication system of claim 1, wherein:
  the authentication information associated with the subscription information comprises a first authentication identification and a second authentication identification; and
  the authenticating the communication device in response to detecting the match between the first and second identifications and the authentication information comprises authenticating the communication device in response to detecting the match between the first and second identifications and the first and second authentication identifications.

6. The authentication system of claim 1, wherein communications between the processor and the expected network element conform to a session initiation protocol, a H.323 video communications protocol, or a combination thereof.

7. A non-transitory machine-readable storage medium comprising executable instructions that, when executed by a processing system including a processor, perform operations, the operations comprising:
  intercepting an authentication request comprising a second identification of a communication device;
  updating the authentication request by inserting a first identification of a virtual gateway into the authentication request, resulting in an updated authentication request, wherein the virtual gateway is located in a building;
  submitting the first identification and the second identification in the updated authentication request to an authentication system, wherein the authentication system determines whether the updated authentication request is received from an expected network element that has a physical association with the virtual gateway; and
  responsive to detecting that the updated authentication request is received from the expected network element:
    retrieving authentication information associated with subscription information for a communication device, according to the first and second identifications of the updated authentication request, wherein the communication device is located in the building; and
    authenticating the communication device in response to detecting a match between the first and second identifications of the updated authentication request and the authentication information,
  wherein the authentication system denies service to the virtual gateway responsive to detecting that the authentication request is not received from the expected network element; and
  wherein the first identification of the virtual gateway comprises a Media Access Control address, a serial number, a model number, and an undisclosed code, each associated with the virtual gateway.

8. The non-transitory machine-readable storage medium of claim 7, wherein:
  the second identification of the communication device comprises one of a Media Access Control address, a terminal ID, a serial number, a model number, and an undisclosed code, each associated with the communication device.

9. The non-transitory machine-readable storage medium of claim 7, wherein the second identification is one of a Session Initiation Protocol Uniform Resource Identifier and a Telephone Uniform Resource Identifier.

10. The non-transitory machine-readable storage medium of claim 7, wherein the expected network element is part of an Internet Protocol Multimedia Subsystem network.

11. The non-transitory machine-readable storage medium of claim 10, wherein the virtual gateway and the expected network element of the Internet Protocol Multimedia Subsystem network are provisioned to have the physical association with each other.

12. The non-transitory machine-readable storage medium of claim 10, wherein other network elements of the Internet Protocol Multimedia Subsystem network deny services to the virtual gateway when the virtual gateway operates outside of the physical association.

13. The non-transitory machine-readable storage medium of claim 10, wherein:
the authentication information associated with the subscription information comprises a first authentication identification and a second authentication identification; and
the authenticating the communication device in response to detecting the match between the first and second identifications of the updated authentication request and the authentication information comprises authenticating the communication device in response to detecting the match between the first and second identifications of the updated authentication request and the first and second authentication identifications.

14. A method comprising:
receiving, by an authentication system comprising a processor, an authentication request from a communication device located in a building, wherein the authentication request comprises a first identification of a virtual gateway that is received by the communication device and a second identification of the communication device, wherein the virtual gateway is located in the building;
retrieving, by the authentication system, a first authentication identification and a second authentication identification according to the first identification and the second identification of the authentication request;
authenticating, by the authentication system, the communication device in response to detecting a match between the first and second identifications and the first and second authentication identifications; and
provisioning, by the authentication system, the virtual gateway and a network element of a packet-switched network to have a physical association with each other, wherein the physical association is derived from the first identification and the second identification, and wherein other network elements of the packet-switched network deny services to the virtual gateway when the virtual gateway operates outside of the physical association;
wherein the second identification of the communication device comprises a Media Access Control address, a terminal ID, a serial number, a model number, and an undisclosed code, each associated with the communication device.

15. The method of claim 14, wherein equipment of a service provider of the packet-switched network is configured to supply the first identification to equipment of a voice-over-internet protocol provider responsive to authentication by the authentication system.

16. The method of claim 14, wherein the virtual gateway is communicatively coupled to a selected digital subscriber line access multiplexer of a plurality of digital subscriber line access multiplexers in the packet-switched network, and
wherein a remaining plurality of digital subscriber line access multiplexers are provisioned to deny services to the virtual gateway when the virtual gateway operates outside of the physical association with the selected digital subscriber line access multiplexer.

17. The method of claim 14, wherein:
the first identification of the virtual gateway comprises one of a Media Access Control address, a serial number, a model number, and an undisclosed code, each associated with the virtual gateway.

18. The method of claim 14, wherein the second identification comprises one of a Session Initiation Protocol Uniform Resource Identifier and a Telephone Uniform Resource Identifier.

19. The method of claim 14, wherein the authentication system comprises a media gateway, the method further comprising:
linking, by the media gateway, packet-switched and circuit-switched technologies to set up, maintain, and terminate a call for the communication device.

20. The method of claim 19, wherein the media gateway converts data from a format required for a circuit-switched network to that required for a packet-switched network.

* * * * *